Nov. 18, 1924.

Re. 15,949

H. W. WHITE

MATERIAL FOR BUILDING CONSTRUCTION

Original Filed Feb. 20. 1920

Inventor:
Henry W. White
By Gillson & Gillson,
Attys.

BEST AVAILABLE COPY

Reissued Nov. 18, 1924. Re. 15,949

UNITED STATES PATENT OFFICE.

HENRY W. WHITE, OF NEW ORLEANS, LOUISIANA.

MATERIAL FOR BUILDING CONSTRUCTION.

Original No. 1,353,619, dated September 21, 1920, Serial No. 360,092, filed February 20, 1920. Application for reissue filed August 23, 1922. Serial No. 583,927.

*To all whom it may concern:*

Be it known that I, HENRY W. WHITE, a citizen of the United States, and resident of New Orleans, parish of Orleans, and State of Louisiana, have invented certain new and useful Improvements in Materials for Building Constructions, of which the following is a specification, and which are illustrated in the accompanying drawings forming a part thereof.

The invention relates to buildings and has for an object the provision of a form of construction that shall be simple, durable, warm, cool, cheap and which may be constructed with a minimum of skilled labor. A further object of the invention is the provision of a form of material that may be used in such construction.

An illustrative embodiment of the invention is shown in the accompanying drawing in which—

Figure 1:
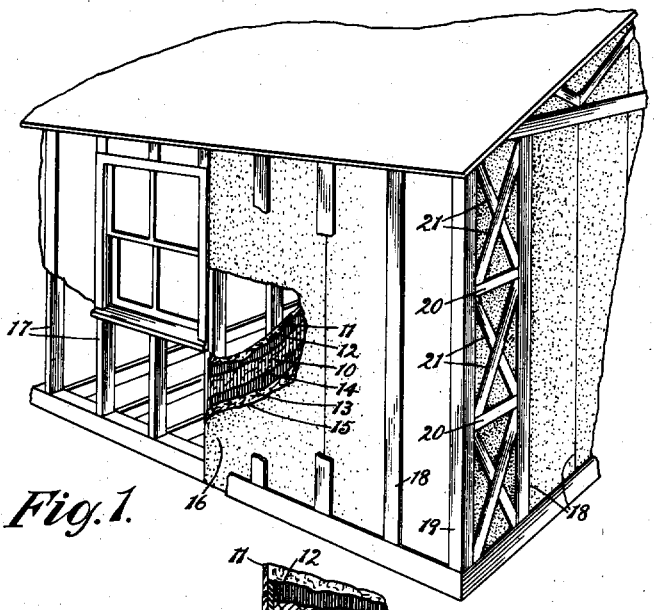
Figure 2:
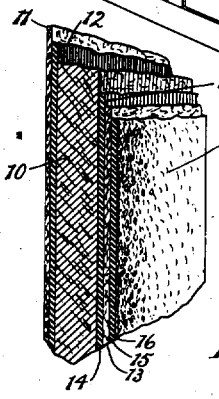

Fig. 1 is a perspective view of a portion of a building partially completed, and partly broken away to show the construction, and Fig. 2 is a detail longitudinal section of a piece of material embodying the improvement in building material.

A building constructed according to the present invention, as shown, comprises as to walls, merely the studding or other frame members, and sheets of material, in the nature of artificial lumber, secured directly thereto and providing all necessary elements for warmth, weather resistance and outside finish of a pleasing appearance. The same structure may also provide the roof if desired but since the construction thereof will be obvious it is not considered necessary to illustrate the same.

The material made according to the invention comprises, as a major element, a layer, as 10, of dry waste fibrous material such as straw, dried grasses of any character, dry leaves, weeds or any other waste material that may be available and which when treated as described, is capable of being formed into a layer of sponge-like nature. To provide the material of the invention the waste material is treated with a waterproofing substance which is capable of causing the elements of the fibrous material to adhere to each other at their points of contact without filling the interspaces in the mass.

The waterproofing material at present preferred for this purpose is asphalt of not too soft a composition. If such an asphalt be applied hot, or in fluid condition by reason of containing a "cut-back" as benzol, the individual fibers or elements of the waste material will be saturated thus rendering the material of these fibers or elements waterproof. To attain the result contemplated by the present invention this waterproofing treatment is carried out in such a manner as to leave no surplus waterproofing material in the mass, only enough being applied to saturate the individual fibers or elements and leave the thinnest possible coating on their surfaces. While the waterproofing material is still soft and adhesive the material is preferably compressed to a sufficient degree to cause the points of contact of the elements with each other to adhere, but not sufficient to close the cells of the mass.

The compression of the cellular mass is preferably produced in the operation of applying surfacing layers to the mass. As shown, a back layer, as 11, is provided formed of felt saturated with asphalt or other waterproofing material, fabric or paper which layer may be coated with an adhesive substance 12, preferably asphalt, of the same nature used in treatment of the fibrous layer 10, for the purpose of causing it to adhere to the cellular layer 10. While the backing layer 11 is preferably thoroughly waterproof yet this quality is not essential since it is not directly exposed to the elements.

As a facing for the cellular layer 10, there is shown a layer 13 preferably felt saturated with asphalt and having a layer or coating of asphalt 14 similar to layer 12 applied thereto to cause adherence of the cellular layer thereto. Preferably the layer 13 is faced by a coating of asphalt 15 having grit, sand, shell, or other non-adhesive refractory material, as 16, embedded therein to conceal and protect asphalt and to provide a pleasing appearance.

To enable the material described to serve without support other than the frame members of the building, the material is so assembled as to be rigid and is formed into flat sheets of a size convenient for handling. Rigidity of the material is furnished by the layer 10 which, for this purpose, is made very much thicker than layer 11, or than combined layers 13, 14, 15. This is feasible because of its cheapness and the thickening of this layer secures the function of heat insulation due to its cellular nature in addition to rigidity. The sheets of material formed as described owe some of their rigidity to an action of the parts of the nature of a truss action, since the surface layers act as tension members and the layer 10 as a body cross connected lattice work.

Having provided sheets of the nature described, a wall may be very readily constructed as shown, by erecting studding, as 17, so spaced that the edges of the sheets may meet on certain of the studs, and the sheets may be nailed directly thereto. To make the joints weather proof and invisible, the edges of the sheets may be coated with fluid asphalt and may be pressed together. The raw asphalt exposed at the joint may be concealed by taking loose material of the nature utilized for layer 16 and pressing it against the joint as by a trowel. The nail heads may be covered by asphalt and grit may be applied thereto at the same time as to the joint.

If preferred the joints may be covered as by a batten 18 and corner boards 19. When this practice is followed, "half timbered" effects may be readily secured by other pieces 20, 21, placed between the battens.

A building embodying the present invention may be constructed in a minimum time with very little skilled labor, and will be durable, warm in winter and cool in summer and its exterior may be given a pleasing appearance chosen from a wide variety of possibilities.

Minor changes may be made in the physical embodiment of the invention without departing from its spirit.

I claim as my invention:

1. A sheet material for the exterior of buildings comprising in combination a layer of waste material, the individual elements of which are saturated and thinly coated with waterproofing material, said elements adhering to each other at their points of contact to form a cellular mass, and a waterproof facing layer adhering to said first named layer.

2. A sheet material for the exterior of buidings comprising, in combination, a major layer of waste fibrous material, the individual elements of which are saturated and thinly coated with bituminous material, said elements adhering at their points of contact in the mass to form a cellular mass, a waterproof facing layer adhering to and closing the cells of said layer at one surface thereof and a backing layer of sheet material adhering to and closing the cells of said layer at the other surface.

3. A sheet material for building construction comprising, in combination, a major layer of waste fibrous material having its individual elements thinly coated with asphalt and adhering at their points of contact to provide a rigidity-giving, heat-insulating cellular mass, a backing layer adhering to and closing the cells of said layer at one surface, a waterproof facing layer adhering to and closing the cells of said layer at its other surface and a layer of weather proof finishing material adhering to said surface layer.

4. The method of manufacturing sheathing boards for buildings, which comprises forming a cellular layer of loose non-felted fibrous material, treating the same with an adhesive compound for binding the fibres together, compressing to a sufficient degree to cause the points of contact of the fibres to adhere without closing the cells, cementing a facing, including an asphalt layer, to the face of said layer of fibrous material, and imbedding a layer of grit in the exposed surface of said asphalt layer.

5. A sheathing board for walls of buildings comprising, in combination, a major layer of non-felting fibrous material, the individual elements of which are thinly coated and cemented to each other at their points of contact with adhesive water proofing material to form a rigidity-giving heat-insulating sponge-like body, and a layer of weather protective material secured to the face of said major layer.

HENRY W. WHITE.